US008731161B1

(12) United States Patent
Fenton et al.

(10) Patent No.: US 8,731,161 B1
(45) Date of Patent: May 20, 2014

(54) CALLING TYPE IDENTIFICATION SYSTEM

(75) Inventors: Keith Eric Fenton, Lone Jack, MO (US); Michael Aaron Hawley, Overland Park, KS (US); Ragunath Palaniappan, Overland Park, KS (US); Stephen P. O'Neal, Overland Park, KS (US); Ameen Khanfar, Lee's Summit, MO (US); Karen S. Riepenkroger, Blue Springs, MO (US); Kenneth A. Spiller, Gardner, KS (US); Lavinia Rotaru, Falls Church, VA (US); Alpesh V. Shah, Overland Park, KS (US); Scott William Groth, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 312 days.

(21) Appl. No.: 13/033,399

(22) Filed: Feb. 23, 2011

Related U.S. Application Data

(60) Provisional application No. 61/353,706, filed on Jun. 11, 2010.

(51) Int. Cl.
*H04M 15/00* (2006.01)

(52) U.S. Cl.
USPC .......... 379/126

(58) Field of Classification Search
USPC .......... 379/207.02, 221.13, 126
See application file for complete search history.

(56) References Cited

U.S. PATENT DOCUMENTS

| | | | | |
|---|---|---|---|---|
| 6,473,503 | B1 * | 10/2002 | Karau et al. | 379/221.13 |
| 6,640,096 | B1 | 10/2003 | Alho et al. | |
| 7,099,664 | B1 * | 8/2006 | Hurst | 455/428 |
| 2004/0096048 | A1 * | 5/2004 | Sacra | 379/221.13 |
| 2004/0252818 | A1 * | 12/2004 | Liu | 379/126 |
| 2008/0233982 | A1 * | 9/2008 | Smith et al. | 455/466 |

* cited by examiner

*Primary Examiner* — Sonia Gay

(57) ABSTRACT

A calling type identification system selects a calling type. The system selects NPA-NXX telephone number blocks for the calling type based on NPA-NXX block categories related to the calling type. The system develops number data for the selected NPA-NXX telephone number blocks. The system receives a telephone number for a call. The system processes the telephone number and the number data to identify and indicate if the telephone call is of the selected calling type.

20 Claims, 6 Drawing Sheets

CALLING TYPE IDENTIFICATION SYSTEM

RELATED CASES

This patent application claims the benefit of U.S. provisional patent application 61/353,706; that was filed on Jun. 11, 2010; that is entitled "CALLING TYPE IDENTIFICATION SYSTEM"; and that is hereby incorporated by reference into this patent application.

TECHNICAL BACKGROUND

A wireless communication user makes and receives calls by operating a wireless communication device to exchange electromagnetic signals over the air with wireless communication networks. Some of the calls are wireless-to-wireless calls with other wireless communication users. Some of the calls are wireless-to-wireline calls or wireline-to-wireless calls with wireline communication users. The wireline communication users operate communication devices that are physically coupled wireline communication networks by a tangible connection, such as metal wires or glass fibers.

These communication networks generate Call Detail Records (CDRs) for each call. A CDR indicates the originating telephone number and the terminating telephone number for the call, among other information, such as the time of the call and possibly the communication network handling the call. Billing computers in the communication networks process the CDRs to charge users for the rendered communication services. In some cases, a communication network will offer a discount for calls between two of its own customers.

To provide this discount, the communication network maintains a list of telephone numbers for its customers. By comparing the originating and terminating telephone numbers from a given CDR to the list, the communication network can determine if the call is between two of its own customers, and then discount the call. In some cases, a group of communication networks may cooperate to share customer number lists and allow for discounts for calls within the group. Unfortunately, this type of cooperation may be difficult to obtain from all desired communication networks.

A communication user originally receives their telephone number from a communication network when they become a customer of that network. That user may then port their telephone number to another communication network. Some users continue to use their same telephone number when they leave a wireless communication network to join a wireline communication network. Other users keep their telephone number when they leave a wireline communication network to join a wireless communication network. The communication industry maintains a database that tracks these ported numbers.

To provide telephone numbers to their customers, communication networks get telephone numbers from an authorized telephone number agency. The telephone number agency provides the telephone numbers to the communication networks in blocks of 10,000. Telephone numbers are commonly represented by the alphabetic code NPA-NXX-XXXX. A 10,000 number block runs from NPA-NXX-0000 to NPA-NXX-9999 (for example from 913-555-0000 to 913-555-9999). The NPA-NXX number blocks are categorized based on their initial use. For example, one NPA-NXX block may be categorized for a type of Internet-based calling and another block may be categorized for a type of wireless calling. There are many of these categories. One example of the categories are Central Office Code (COC) categories. When a telephone number is ported, however, the category of its NPA-NXX block may no longer apply.

Overview

A calling type identification system selects a calling type. The system selects NPA-NXX telephone number blocks for the calling type based on NPA-NXX block categories related to the calling type. The system develops number data for the selected NPA-NXX telephone number blocks. The system receives a telephone number for a call. The system processes the telephone number and the number data to identify and indicate if the telephone call is of the selected calling type.

DETAILED DESCRIPTION

Figure 1:
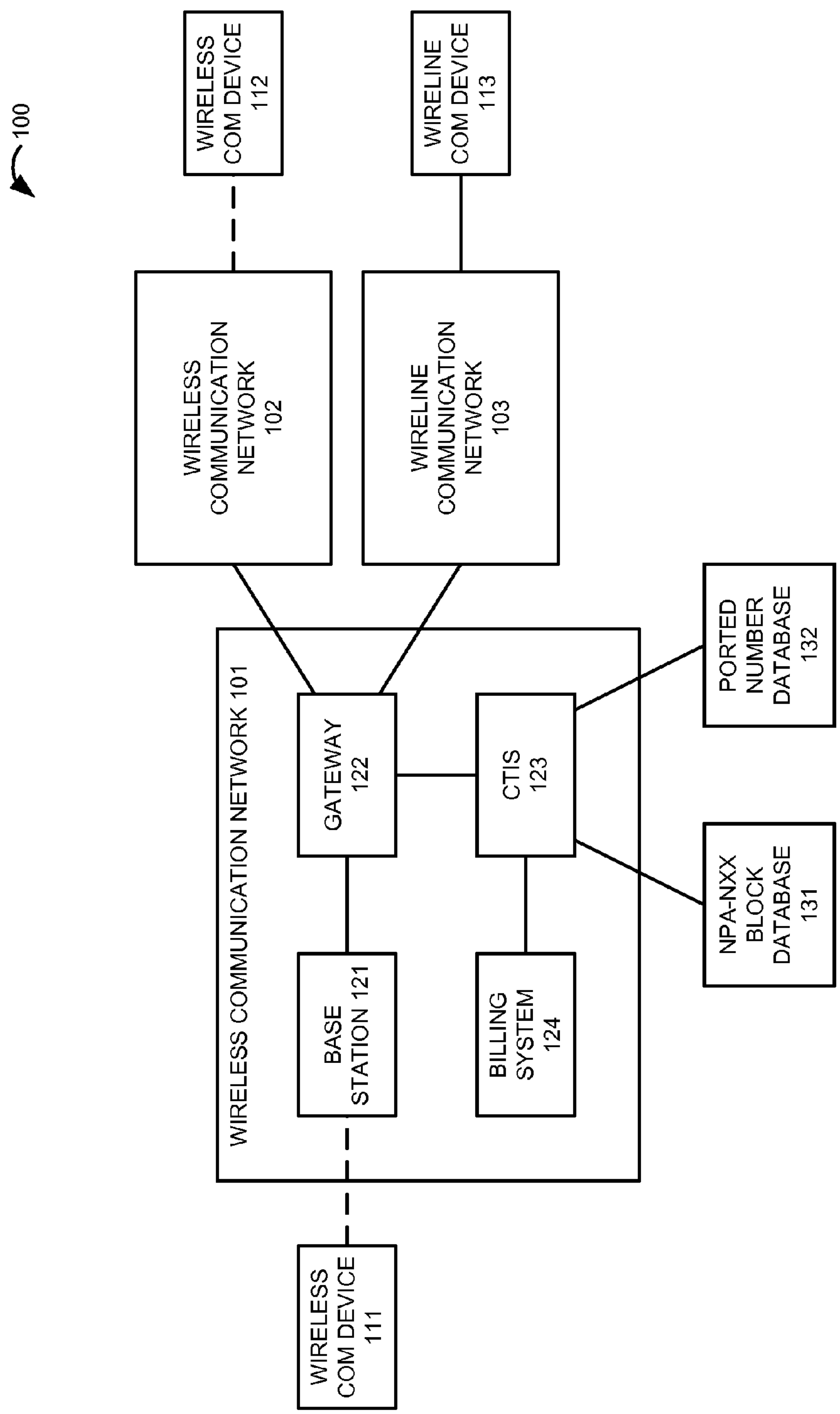
FIG. 1 illustrates a communication system to identify calling types.

FIG. 1 illustrates communication system 100 to identify calling types. Communication system 100 comprises wireless communication networks 101-102, wireline communication network 103, wireless communication devices 111-112, wireline communication device 113, NPA-NXX block database 131, and ported number database 132. Wireless communication network 101 comprises base station 121, gateway 122, Calling Type Identification System (CTIS) 123, and billing system 124.

Wireless communication device 111 has an associated telephone number and wirelessly communicates with base station 121 in wireless communication network 101. Wireless communication device 112 has an associated telephone number and wirelessly communicates with wireless communication network 102. Wireline communication device 113 has an associated telephone number and communicates with wireline communication network 103. In operation, communication devices 111-113 call one another over communication networks 101-103. The calls could be any communication that uses a telephone number for routing, such as voice sessions, video sessions, text messages, picture mails, data messages, and the like. For calls to and from wireless communication device 111, gateway 122 transfers a CDR indicating the originating telephone number and terminating telephone number to CTIS 123.

CTIS 123 receives data from NPA-NXX block database 131 that indicates NPA-NXX telephone number blocks and their categories. In some examples, NPA-NXX block database 131 comprises a Local Exchange Routing Guide database. CTIS 123 receives data from ported number database 132 that indicates ported telephone numbers and the type of networks that now serve the ported numbers. In some examples, ported number database 132 could be a Number Portability Administration Center database. CTIS 123 adds a calling type indicator to at least some of the CDRs and transfers the CDRs to billing system 124. Billing system 124 may discount the calls based on the calling type indicator.

In an exemplary operation, the NPA-NXX block categories that are associated with the calling type are determined. For example, wireless calling may be associated with four of the block categories referred to for simplicity as A, B, C, and D. The NPA-NXX blocks associated with each category are then determined. For example, telephone number block category C may be associated with the NPA-NXX of 913-555 and 913-315. A full telephone number set is then generated for the associated NPA-NXX blocks. For example, the set for 913-555 would be 913-555-0000 to 913-555-9999, and the set for 913-315 would be 913-315-0000 to 913-315-9999. Thus, a telephone number set is generated for a calling type based on the number block categories that are associated with the calling type.

The telephone number set for the calling type is then edited based ported telephone number information as it relates to the calling type. Telephone numbers that are ported into the calling type are added to the number set, and telephone numbers that are ported out of the calling type are removed from the number set. For example, if a telephone number is ported from a wireless communication network to a wireline communication network, then that telephone number is removed from the telephone number set for the wireless calling type. If another telephone number is ported from a wireline communication network to a wireless communication network, then the telephone number is added to the telephone number set for the wireless calling type.

Note that a telephone number may be ported from a first communication network that uses one calling type to a second communication network that uses the same calling type. In this scenario, the telephone number set for the calling type is not edited. For example, the telephone number may be ported from one wireless communication network to another, so the telephone number would remain in the telephone number set for wireless calling.

As new NPA-NXX blocks are released, the category for the new block is processed, so these telephone numbers can be added to existing telephone number sets based on the block category. For example, if a new NPA-NXX block is given category C (associated with wireless calling), then the telephone numbers in the new block are added to the telephone number set for the wireless calling type.

The telephone number sets are then used to identify the calling type of an individual call based on the originating and/or terminating telephone numbers for the call. In the example of wireless-to-wireless calling, the wireless communication network may first process the telephone numbers for the call against its own customer number list to determine if at least one of the telephone numbers for the call is on their customer list (and is a wireless call). If so, the other telephone number for the call is then processed against the telephone number set for wireless calling to determine if the call was with another wireless user, and thus, wireless-to-wireless calling is identified. If desired, the use of the customer list could be omitted and both the originating and terminating telephone numbers could be processed against the wireless calling telephone number set to identify wireless-to-wireless calling.

By selecting a different calling type and generating its associated telephone number set, a communication network can determine if the calls of its customers are in that calling type. For example, the wireless communication network could generate a telephone number set for internet calling and use the internet telephone number set to identify wireless-to-internet calls or internet-to-wireless calls.

If desired, the origination and termination telephone numbers for a call could be separately processed with one or more telephone number sets to identify calling types on an origination-termination basis. For example, a communication network may desire to identify wireless-to-internet calling (as opposed to internet-to-wireless calling). To accomplish this, the originating telephone number is processed against the wireless calling number set (or customer number list) and the terminating telephone number is processed against the internet calling number set.

Figure 2:
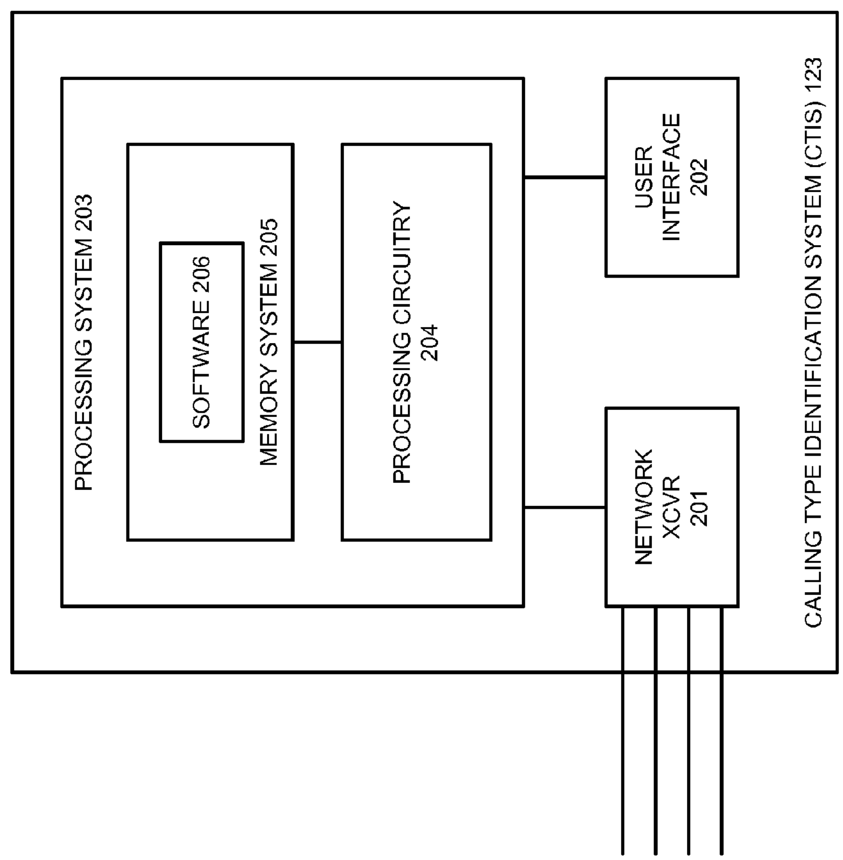
FIG. 2 illustrates a calling type identification system for the communication system.

FIG. 2 illustrates CTIS 123. CTIS 123 could be a discrete system, a distributed system, and/or could be integrated into other systems. For example, CTIS 123 could be integrated into gateway 122, billing system 124, or some other processing system. CTIS 123 comprises network transceiver 201, user interface 202, and processing system 203. Processing system 203 comprises processing circuitry 204 and memory system 205 that stores operating software 206. Processing system 203 is linked to transceiver 201 and user interface 202. CTIS 123 may include other well-known components that are not shown for clarity, such as an additional communication interface, router, server, database, processor, power supply, enclosure, and the like.

Network transceiver 201 is coupled to network communication links to communicate with gateway 122, databases 131-132, and possibly other systems. Network transceiver 201 comprises communication ports, signal processing circuitry, software, and/or some other communication components. Network transceiver 201 may use various communication protocols, such as time division multiplex, internet, Ethernet, wireless, or some other communication format—including combinations thereof. Network transceiver 201 receives data from databases 131-132, receives CDRs from gateway 122, and transfers CDRs to billing system 124 and possibly other systems.

User interface 202 comprises other components that interact with a system operator, such as graphic displays, keys, buttons, touch-pads, and the like.

Processing circuitry 204 comprises microprocessor and other circuitry that retrieves and executes operating software 206 from memory system 205. Memory system 205 comprises a computer-readable storage medium, such as a disk drive, flash drive, data storage circuitry, or some other memory apparatus. Memory system 205 could be a single device or be distributed across multiple devices. Processing circuitry 204 is typically mounted on one or more circuit boards that may also hold portions of memory system 205, transceiver 201, and user interface 202.

Operating software 206 comprises computer programs, firmware, or some other form of computer-readable processing instructions. Operating software 206 may include an operating system, utilities, drivers, network interfaces, applications, or some other type of software. For example, operating software 206 might include: 1) an operating system module to interface with the user interface, processing circuitry, and memory; 2) a networking module to direct external data communications; 3) an NPA-NXX module to develop and edit telephone number sets based on selected block categories, 4) a ported number module to edit the telephone number sets based on ported number data, 5) and a CDR module to process CDRs with the telephone number sets to identify and mark CDRs for selected calling types. Thus, when executed by processing circuitry 204, operating software 206 directs processing system 203 to operate CTIS 123 as described herein.

Figure 3:
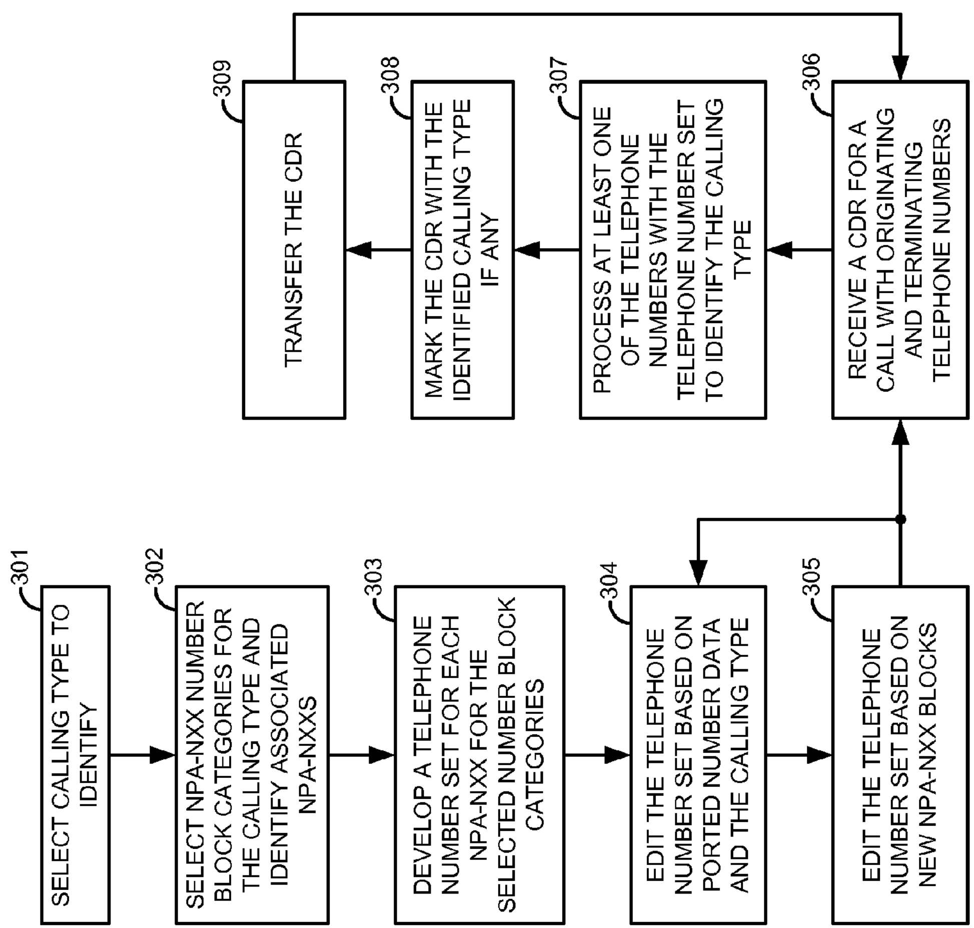
FIG. 3 illustrates the operation of a calling type identification system.

FIG. 3 illustrates the operation of CTIS 123. CTIS 123 receives the selection of a calling type from the system operator (301), such as wireless-to-wireless calling or wireless-to-internet calling. CTIS 123 selects number block categories for the selected calling type and identifies each NPA-NXX associated with the selected block categories (302). For example, CTIS 123 could use a look-up table that translates calling types into the NPA-NXXs, where the look-up table is pre-configured for various calling types by network technicians. In alternative examples, the system operator could input the selected block categories and NPA-NXXs. For wireless calling, the selected categories might be the following COC categories: 1) Public Mobile Carrier (Type 2 Interconnected), 2) Radio Common Carrier (Dedicated Type 1 Interconnected), 3) Service Provider 1—Miscellaneous Service (Type 1 Interconnected), and 4) Service Provider 2—Miscellaneous Service (Type 2 Interconnected). Other categories could be used in other examples.

CTIS 123 develops a telephone number set for the NPA-NXXs for the calling type (303). CTIS 123 edits the telephone number set to add and remove ported telephone numbers based on the calling type and the communication networks now serving the ported numbers (304). CTIS 123 edits the telephone number set to add telephone numbers based on new NPA-NXX blocks and their categories (305). This editing process loops back on itself and is on-going—perhaps every 15 minutes, 24 hours, or some other time period.

CTIS 123 receives a CDR for a call having the originating and terminating telephone numbers for the call (306). Although not shown, CTIS 123 may process the telephone numbers from the CDR to determine if one or both of the telephone numbers are on a customer telephone list. This process could be used to identify calling type if both telephone numbers are on the customer list, although this process could be omitted as well. CTIS 123 processes at least one of the telephone numbers with the telephone number set to identify if the call is of the selected calling type (307). As discussed above, the originating and terminating telephone numbers may be processed separately with one or more telephone number sets based on the calling type of interest. In addition, if one of the telephone numbers is on the customer list, then only the other telephone number may be processed with a telephone number set to identify the calling type.

If the selected calling type is identified, CTIS 123 adds an indicator to the CDR indicating the calling type (308). For example, CTIS 123 could add a first indicator to the CDR for the wireless-to-wireless calling type and add a second indicator to the CDR for the wireless-to-wireline calling type. CTIS 123 transfers the marked CDRs to billing system 124 or another system (309).

In some examples, billing system 124 applies a discount to the call based on the calling type indicator provided by CTIS 123. In some cases, wireless-to-wireless calls are discounted (or provided on an unlimited basis), but wireless-to-wireline calls and wireline-to-wireless calls are not discounted (they are provided on a limited basis).

Figure 4:
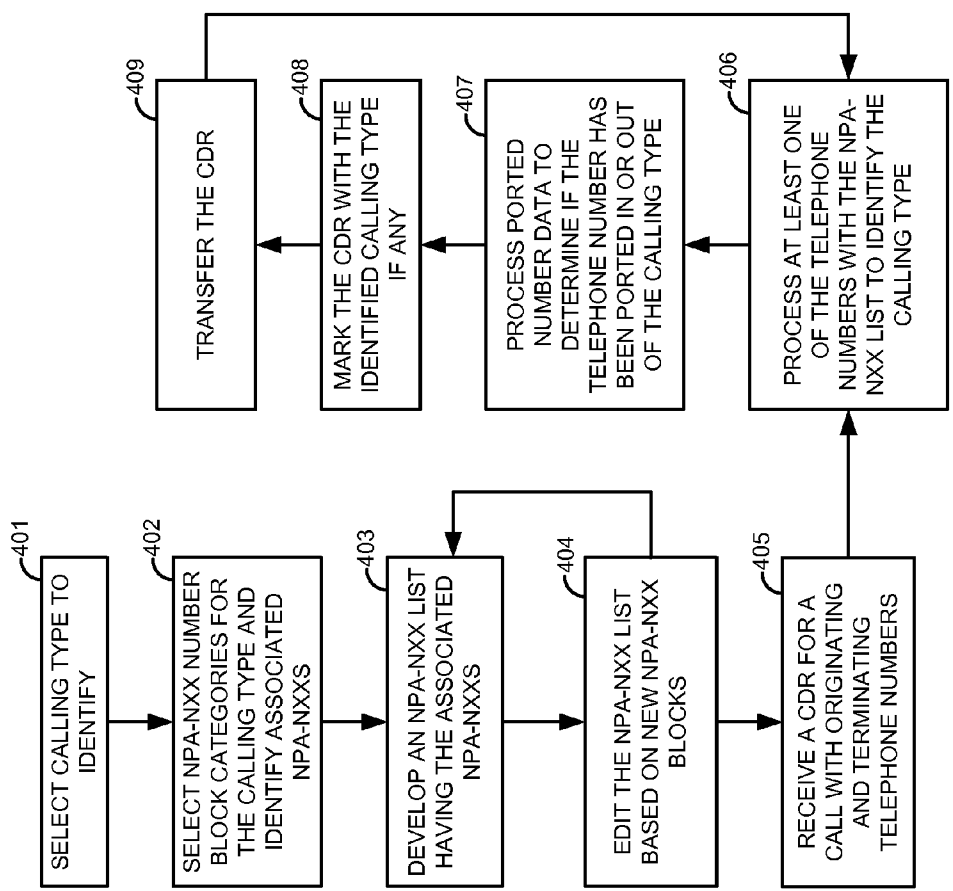
FIG. 4 illustrates the operation of a calling type identification system.

FIG. 4 illustrates an alternative operation of CTIS 123. CTIS 123 receives the selection of a calling type from the system operator (401). CTIS 123 selects number block categories for the selected calling type and identifies each NPA-NXX associated with the selected block categories (402). CTIS 123 develops a list of the NPA-NXXs associated with the selected block categories for the calling type (403). CTIS 123 edits the NPA-NXX list based on new NPA-NXX blocks and their categories (404). If a new NPA-NXX has one of the selected categories for the calling type, then the NPA-NXX is added to the NPA-NXX list for the calling type. This editing process loops back on itself.

CTIS 123 receives a CDR for a call having the originating and terminating telephone numbers for the call (405). Although not shown, CTIS 123 may process the telephone numbers from the CDR to determine if one or both of the telephone numbers are on a customer telephone list. This process could be used to identify calling type if both telephone numbers are on the customer list, although this process could be omitted as well. CTIS 123 processes at least one of the telephone numbers with the NPA-NXX list to identify if the call is of the selected calling type (406). As discussed above, the originating and terminating telephone numbers may be processed separately with one or more telephone number sets based on the calling type of interest. In addition, if one of the telephone numbers is on the customer list, then only the other telephone number may be processed with an NPA-NXX list to identify the calling type.

CTIS 123 processes ported number data to determine if the telephone number has been ported into or out of the calling type (407). For example, a telephone number may have an NPA-NXX that is in the wireless calling type, but the number has been ported to a wireline network. Thus, the telephone number has been ported out of the wireless calling type. In another example, a telephone number may have an NPA-NXX that is not in the wireless calling type, but the number has been ported to a wireless network. Thus, the telephone number has been ported into the wireless calling type.

If the selected calling type is identified, CTIS 123 adds an indicator to the CDR indicating the calling type (408). For example, CTIS 123 could add a first indicator to the CDR for the wireless-to-wireless calling type and add a second indicator to the CDR for the wireless-to-wireline calling type. CTIS 123 transfers the marked CDRs to billing system 124 or another system (409).

Figure 5:
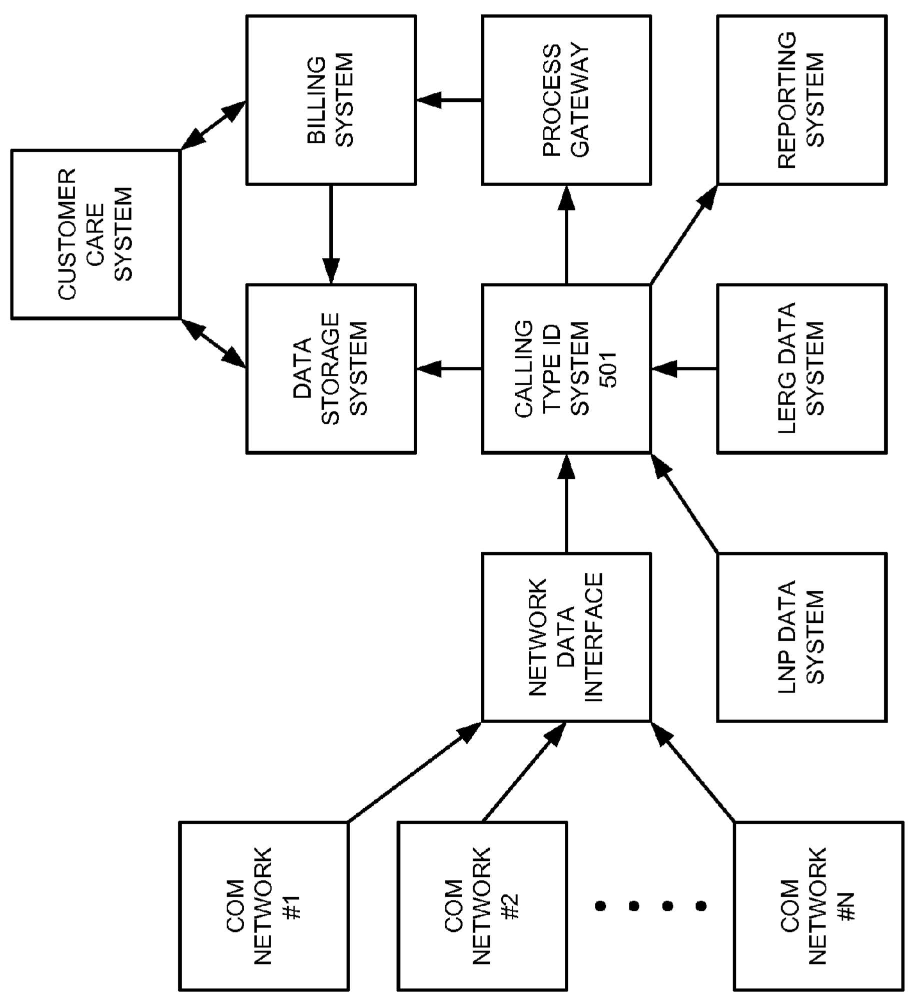
FIG. 5 illustrates a communication system to identify calling types.

FIG. 5 illustrates communication system 500 to identify calling types. Communication system is an example communication system 100, although system 100 may use alternative configurations and operations. Communication system 500 includes various communication networks #1-N, such as wireless networks, wireline networks, IP-based networks, and the like. Communication networks #1-N transfer CDRs to the network data interface.

The network data interface transfers the CDRs to calling type ID system 501. The network data interface may perform formatting and data mediation on the CDRs.

The LNP data system receives LNP information from the Number Portability Administration Center. The LNP data system provides a data gateway for incoming LNP information and performs an LNP data brokering service for calling type ID system 501.

The Local Exchange Routing Guide (LERG) data system provides NPA-NXX data to calling type ID system 501, typically in a flat file format.

Calling type ID system 501 processes the LNP and NPA-NXX data to generate telephone number data sets for the wireless calling type (and/or other types). Calling type ID system 501 processes CDRs with the telephone number data sets to identify individual CDRs with the wireless-to-wireless calling type (and/or other types). Note that a customer telephone number list may be used to identify one end of a wireless-to-wireless call (and/or other types). Calling type ID system 501 marks the appropriate CDRs with the wireless-to-wireless calling type (and/or other types) and transfers the marked CDRs to the processing gateway. Calling type ID system 501 also transfers the marked CDRs to the data storage system. Calling type ID system 501 provides calling type data to the reporting system for statistical analysis and report generation.

The processing gateway transfers the CDRs to the billing system.

The billing system applies billing charges based on the wireless-to-wireless calling type indicated by the CDR marking (and/or other marks). The billing system transfers corresponding billing data to the data storage system.

The customer care system interacts with the data storage system and the billing system.

Figure 6:
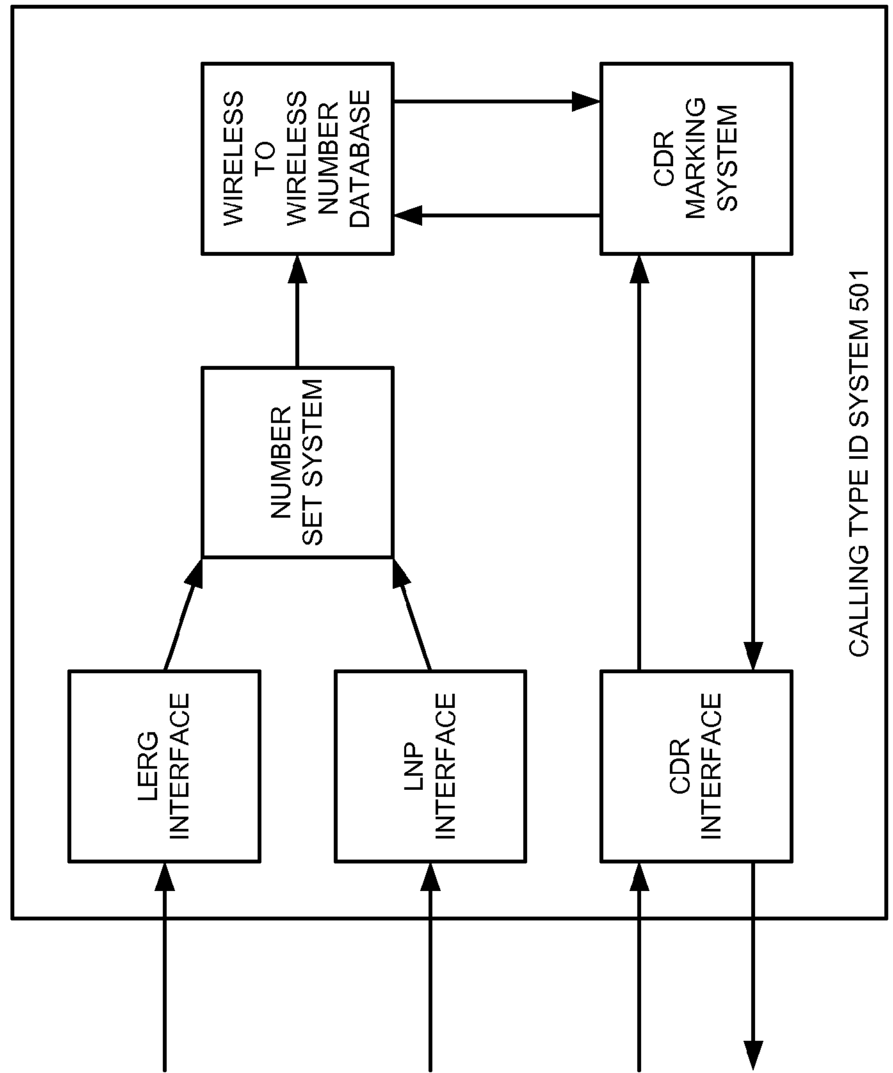
FIG. 6 is a block diagram that illustrates a network control system.

FIG. 6 illustrates calling type ID system 501. The LERG interface receives the Daily Master Line Range Feed from the LNP data system. The LERG interface provides corresponding batch files to the number set system every 24 hours.

The LNP interface pulls real time updates for ported numbers and pooled ranges from the LNP data system. The LNP interface provides corresponding batch files to the number set system every 15 minutes. The number set system processes the batch files for the LNP and NPA-NXX data to generate the telephone number sets for the wireless-to-wireless call type (and/or other types). Thus, the number sets indicate the telephone numbers for wireless calls.

The CDR interface receives CDRs from the network data interface and provides the CDRs to the CDR marking system. The CDR marking system processes the originating and/or terminating telephone numbers in the CDRs against the telephone number sets for the wireless calling type to identify wireless-to-wireless calls (and/or other types). Note that a customer telephone number list may be used to identify one end of a wireless-to-wireless call (and/or other types). The CDR marking system marks the CDRS for wireless-to-wireless calls (and/or other types) and transfers the marked CDRs to the CDR interface. The CDR interface transfers the marked CDRs to the processing gateway for billing and possibly other uses.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a calling type identification system comprising:

- a communication interface receiving a selected calling type;
- the communication interface receiving NPA-NXX telephone number blocks for the selected calling type based on NPA-NXX block categories;
- a processing system developing a telephone number set for the selected NPA-NXX telephone number blocks;
- the processing system editing the telephone number set based on ported telephone number data and new NPA-NXX telephone number blocks and their categories;
- the communication interface receiving a telephone number for a call; and
- the processing system processing the telephone number and the telephone number set to identify the calling type for the call;
- the processing system adding an indicator to a Call Detail Record (CDR) indicating the calling type, in response to the selected calling type being identified.

2. The method of claim 1 wherein the calling type comprises a wireless calling type.

3. The method of claim 2 wherein receiving the NPA-NXX telephone number blocks for the wireless calling type based on the NPA-NXX block categories comprises selecting at least one of the NPA-NXX telephone number blocks based on a Public Mobile Carrier (Type 2 Interconnected) Central Office Code category.

4. The method of claim 2 wherein receiving the NPA-NXX telephone number blocks for the wireless calling type based on the NPA-NXX block categories comprises selecting at least one of the NPA-NXX telephone number blocks based on a Radio Common Carrier (Dedicated Type 1 Interconnected) Central Office Code category.

5. The method of claim 2 wherein receiving the NPA-NXX telephone number blocks for the wireless calling type based on the NPA-NXX block categories comprises selecting at least one of the NPA-NXX telephone number blocks based on a Service Provider 1—Miscellaneous Service (Type 1 Interconnected) Central Office Code category.

6. The method of claim 2 wherein receiving the NPA-NXX telephone number blocks for the wireless calling type based on the NPA-NXX block categories comprises selecting at least one of the NPA-NXX telephone number blocks based on a Service Provider 2—Miscellaneous Service (Type 2 Interconnected) Central Office Code category.

7. The method of claim 1 wherein the calling type comprises a wireline calling type.

8. The method of claim 1 wherein the calling type comprises an Internet calling type.

9. The method of claim 1 wherein editing the telephone number set based on the ported telephone number data comprises removing a telephone number from the telephone number set for a wireless calling type if the telephone number is ported from a wireless communication network to a wireline communication network.

10. The method of claim 1 wherein editing the telephone number set based on the ported telephone number data comprises adding a telephone number to the telephone number set for a wireless calling type if the telephone number is ported from a wireline communication network to a wireless communication network.

11. A calling type identification system comprising:

- a communication interface configured to receive a selected calling type and selected NPA-NXX block categories for the selected calling type;
- a processing system configured to develop a telephone number set for NPA-NXX telephone number blocks having the selected NPA-NXX block categories for the selected calling type;
- the processing system is configured to edit the telephone number set based on ported telephone number data and new NPA-NXX telephone number blocks and their categories;
- the communication interface is configured to receive a telephone number for a call; and
- the processing system is configured to process the telephone number and the telephone number set to identify the calling type for the call; and
- the processing system is configured to add an indicator to a Call Detail Record (CDR) if the call is of the selected calling type.

12. The calling type identification system of claim 11 wherein the calling type comprises a wireless calling type.

13. The calling type identification system of claim 12 wherein one of the NPA-NXX telephone number blocks is associated with a Public Mobile Carrier (Type 2 Interconnected) Central Office Code category.

14. The calling type identification system of claim 12 wherein one of the NPA-NXX telephone number blocks is associated with a Radio Common Carrier (Dedicated Type 1 Interconnected) Central Office Code category.

15. The calling type identification system of claim 12 wherein one of the NPA-NXX telephone number blocks is associated with a Service Provider 1—Miscellaneous Service (Type 1 Interconnected) Central Office Code category.

16. The calling type identification system of claim 12 wherein one of the NPA-NXX telephone number blocks is associated with a Service Provider 2—Miscellaneous Service (Type 2 Interconnected) Central Office Code category.

17. The calling type identification system of claim 11 wherein the calling type comprises a wireline calling type.

18. The calling type identification system of claim 11 wherein the calling type comprises an Internet calling type.

19. The calling type identification system of claim 11 wherein the processing system is configured to remove a telephone number from the telephone number set for a wireless calling type if the telephone number is ported from a wireless communication network to a wireline communication network.

20. The calling type identification system of claim 11 wherein the processing system is configured to add a telephone number to the telephone number set for a wireless calling type if the telephone number is ported from a wireline communication network to a wireless communication network.

* * * * *